United States Patent
Mueller et al.

(10) Patent No.: US 11,041,263 B2
(45) Date of Patent: Jun. 22, 2021

(54) SPACER FABRIC, COMPOSITE MATERIAL FORMED WITH THE SPACER FABRIC AND USE OF THE COMPOSITE MATERIAL

(71) Applicant: Mueller Textil GmbH, Wiehl-Drabenderhoehe (DE)

(72) Inventors: Frank Mueller, Wiehl (DE); Stefan Mueller, Wiehl (DE)

(73) Assignee: MUELLER TEXTIL GMBH, Wiehl-Drabenderhoehe (DE)

(*) Notice: Subject to any disclaimer, the term of this patent is extended or adjusted under 35 U.S.C. 154(b) by 434 days.

(21) Appl. No.: 15/854,532

(22) Filed: Dec. 26, 2017

(65) Prior Publication Data

US 2018/0187348 A1   Jul. 5, 2018

(30) Foreign Application Priority Data

Dec. 29, 2016  (DE) .................... 10 2016 125 881.4

(51) Int. Cl.
   *D04B 21/14*  (2006.01)
   *B32B 5/02*   (2006.01)

(52) U.S. Cl.
   CPC .............. *D04B 21/14* (2013.01); *B32B 5/026* (2013.01); *B32B 2305/186* (2013.01); *B32B 2605/003* (2013.01); *D10B 2403/021* (2013.01); *D10B 2403/0213* (2013.01); *D10B 2505/08* (2013.01); *D10B 2505/12* (2013.01); *Y10T 442/45* (2015.04)

(58) Field of Classification Search
   CPC ....... D04B 21/06; D04B 21/20; D04B 21/202
   USPC ......................................................... 442/312
   See application file for complete search history.

(56) References Cited

U.S. PATENT DOCUMENTS

2011/0247370 A1* 10/2011 Akao .................... D04B 21/16
                                                          66/195

OTHER PUBLICATIONS

D.F. Paling, "Warp Knitting Technology" 1952, Columbine Press p. 113, Fig. 72.

* cited by examiner

*Primary Examiner* — Jenna L Johnson
(74) *Attorney, Agent, or Firm* — Andrew Wilford

(57) ABSTRACT

A warp-knitted spacer fabric has a first and a second planar warp-knit layer that are joined together by spacer yarns. The first warp-knit layer is formed by a first yarn system having a first pattern and a second yarn system having a second pattern. The first pattern is a modified pillar-stitch in which the yarns of the first yarn system form pillar stitches in alternating sequence in the working direction and are guided without formation of stitches, and the yarns of the second yarn system are each guided over at least two adjacent stitch wales and running in the working direction. The second warp-knit layer has openings formed by a plurality of stitches.

10 Claims, 4 Drawing Sheets

SPACER FABRIC, COMPOSITE MATERIAL FORMED WITH THE SPACER FABRIC AND USE OF THE COMPOSITE MATERIAL

FIELD OF THE INVENTION

The invention relates to a warp-knitted spacer fabric, a composite material formed therewith and the use of the composite material for the interior furnishings of a motor vehicle.

BACKGROUND OF THE INVENTION

In specific terms, the invention relates to a warp-knitted spacer fabric having a first planar warp-knit layer and a second planar warp-knit layer joined by spacer yarns, the first warp-knit layer being formed by a first yarn system using a first stitch pattern and a second yarn system using a second stitch pattern, a modified pillar-stitch being provided as the first stitch pattern in which the yarns of the first yarn system form pillar stitches and are guided without forming stitches in alternating sequence in the working direction and the yarns of the second yarn system are each guided over at least two adjacent stitch wales running in the working direction.

Warp-knitted spacer fabrics are characterized by a light air-permeable structure, where warp-knitted spacer fabrics are elastic in the direction of their thickness due to the spacer yarns running between the two layers of knit fabric.

Because of these properties, warp-knitted spacer fabrics are soft, elastic layers that allow air circulation and are therefore provided in mattresses, upholstered furniture, clothing items and shoes. Warp-knitted spacer fabrics are also used as technical textiles in the automotive field, for example, for air-conditioned seats and seat covers where warp-knitted spacer fabrics permit good adaptation to contours because of their cushioning properties and their very good restoring behavior.

In addition, however, warp-knitted spacer fabrics are also suitable in other applications, for example, in furniture making and for backing systems in particular. Thus, spacer textiles, for example, are used for lining interiors in the automotive field where composite materials with a spacer textile and a cover layer laminated thereto, for example leather, artificial leather or a decorative film, may be used for covering the headliner, dashboard, center console and the insides of doors.

A composite material having a warp-knitted spacer fabric and a covering and decorative layer is usually joined to a basic substrate construction that is either rigid or flexible. For example, the composite material for the interior trim or for furniture making can be applied to a rigid substrate or in forming a seat or a seat surface it may also be applied to a flexible substrate.

In the case of both rigid and flexible substrates, this yields the advantage that rounded curves, angles and other three-dimensional shapes can be accommodated to a certain extent by the warp-knitted spacer fabric, so that in many cases it is possible to prevent excessive deformation and in particular kinking of the top layer and decorative layer. In addition, this yields a particularly pleasant soft feel for the user due to the flexibility of the warp-knitted spacer fabric, but a predetermined shape is also retained, at least after an elastic reset, due to the elastic restoring forces of the warp-knitted spacer fabric.

Although to some extent, warp-knitted spacer fabrics are far superior to other elastic materials with regard to these properties, there is the need in particular with products having a complicated shape and especially long-lived products to further improve on the mechanical properties of the warp-knitted spacer fabric and in particular to prevent excessive kinking of the top layer. In this context, a balance is to be found between the soft and flexible properties of the warp-knitted spacer fabric and the positive supporting function of the warp-knitted spacer fabrics.

Warp-knitted spacer fabrics are used in practice for a wide variety of purposes, for which specific optimization is often provided.

A warp-knitted spacer fabric according to the preamble of patent claim 1 is known from DE 10 2010 010 524 B4, wherein a reduced tensile strength is to be made available in specific cases for use of the warp-knitted spacer fabric over an airbag and/or an airbag valve in several locations.

To this end, the top two layers of the warp-knitted spacer fabric are each made of a basic yarn system and another yarn system, and a first portion of the rows of stitches is formed at least by the basic yarn system, a second portion of the rows of stitches is formed by the second yarn system, the yarn and/or the yarns of the basic yarn system being guided without forming stitches in the second portion of the rows of stitches and/or is/are guided and the top layers on the second part of the rows of stitches having a lower tensile strength in the direction of production than on the first part of the rows of stitches.

By omitting stitches, lines of weakness running tranversely are thus also formed, and corresponding lines of weakness are arrayed one above the other or with a slight offset from one another in both warp-knit layers, so that the two warp-knit layers are designed the same with regard to their functionality. Accordingly, the two warp-knit layers also have the same or at least comparable mechanical properties, not only with regard to their tensile strength but also with regard to their bending stiffness and flexibility.

With the use of the warp-knitted spacer fabric over an airbag as described here, the advantageous breathability of a warp-knitted spacer fabric is of subordinate importance, and the openings in the warp-knit layers known according to the further prior art to improve the breathability cannot be implemented because of the required pull-out function.

According to DE 10 2014 103 861 [US 2017/0088987], a warp-knitted spacer fabric is known having two planar warp-knit layers with spacer yarns between and having openings formed by several stitches in both warp-knit layers. The result is a type of mesh structure that yields a particularly great permeability to air, on the one hand, and a very great flexibility, on the other hand.

To limit the flexibility in the longitudinal and transverse directions in particular with such a material, additional yarns are provided in the first warp-knit layer, these yarns being at least partially fused, thereby causing a stiffening of the first warp-knit layer.

Finally, DE 10 2012 13 194 discloses a liquid distributing layer formed by a warp-knitted spacer fabric for incontinence products, wherein only one of the two warp-knit layers has openings and the other warp-knit layer is formed by a uniform and essentially closed knit pattern.

DE 698 26 264 [U.S. Pat. No. 6,196,032] describes a double-sided warp knit fabric with a double-sided effect. The double-sided warp knit fabric is formed by a first backing fabric and a second backing fabric, and the surfaces produced from sewing yarns and basic yarn comprise different structures. Sewing yarns and basic yarn are bound to one another in such a way that they cover pile yarns on the surface.

OBJECT OF THE INVENTION

The object of the present invention is to provide a warp-knitted spacer fabric that has an improved shapeability with respect to angles and bends when combined with a covering and decorative layer and in particular that permits an improved protection of the covering and decorative layer. Furthermore, another object is to provide a composite material comprised of the warp-knitted spacer fabric, the covering and decorative layer as well as a preferred use of the composite material.

SUMMARY OF THE INVENTION

Starting from a generic warp-knitted spacer fabric, it is thus provided within the scope of the present invention that the second warp-knit layer has openings formed by a plurality of stitches, so that second warp-knit layer is readily flexible and shapeable in the plane like a mesh, while the first warp-knit layer allows only a slight elongation tranversely due to the alternating sequence of pillar stitches and standing yarns with regard to the working direction and due to the extensive yarn system tranversely running over at least two stitch wales. At the same time, the first warp-knit layer has only a relatively minor bending stiffness, which very easily permits bending in particular, such that the first warp-knit layer can easily follow a three-dimensional shape but without expanding or contracting in an unwanted manner.

The lower flexural strength of the first warp-knit layer is made possible by the first stitch pattern as well as the second stitch pattern of the first yarn system and/or of the second yarn system. Since the individual yarns run only along one stitch wale according to the first stitch pattern in a modified pillar-stitch, the individual stitch wales may be angled slightly tranversely with respect to one another, but at the same time the second yarn system will avoid excessive stretching or contraction tranversely. A low flexural stiffness with regard to the working direction is achieved by the fact that pillar stitches are omitted at regular intervals in the first yarn system by guiding the yarns over a predetermined length there as standing yarns.

Each individual yarn of the second yarn system extends over at least two neighboring stitch wales. According to the invention, this includes not only a tricot pattern in which the individual yarns extend over precisely two neighboring stitch wales, but also a cloth pattern, a satin pattern and a velvet pattern, in which each yarn extends over three, four or five stitch wales. As already mentioned above, the second yarn system ensures the binding of the first warp-knit layer tranversely.

In contrast with the second warp-knit layer, the first warp-knit layer does not have any openings formed by multiple stitches. The result is not openings projecting beyond the distance of neighboring stitch wales and neighboring rows of stitches. Within these specifications, a relatively great breathability and air permeability are nevertheless achieved through the knit pattern according to the invention.

The subject matter of the present invention is also a composite material provided in particular for the interior of a motor vehicle and formed from the warp-knitted spacer fabric described above as well as a covering and decorative layer, where the covering and decorative layer is held on the first warp-knit layer of the warp-knitted spacer fabric, for example, by an adhesive. The first warp-knit layer in such a configuration results in an advantageous reinforcement of the covering and decorative layer, and the decorative layer is protected from unwanted compression and stretching by the stability of the first warp-knit layer in the plane.

With regard to bending of the warp-knitted spacer fabric and/or a composite material formed with the warp-knitted spacer fabric, the result is a completely different behavior than with a uniform layer material. Whereas in the case of a uniform layer material, such as a thick plastic film, for example, the neutral fiber is usually at the center of the thickness during bending, but with the warp-knitted spacer fabric according to the invention, the neutral fiber, i.e. where no essential compression or stretching occurs in the event of bending, is located in the first warp-knit layer. The stretching and compression required for bending are therefore provided, starting with the second warp-knit layer, which not only has very good breathability due to the structure according to the invention with openings but can also be deformed easily in the plane.

The spacer yarns serve as an equalizing layer in a known way.

According to the invention the second warp-knit layer has openings formed by a plurality of stitches. Such a structure can be achieved by means of a filet pattern. Even with such a design, however, it is usually provided that the yarns forming the second warp-knit layer will form stitches in each stitch wale, i.e. no stitches are missed in the knitting process. The second warp-knit layer is preferably also created with two yarn systems and/or two guide bars. Although the spacer yarns are also formed with two pattern wales in this case, this is on the whole a knitting process with six pattern wales.

According to the invention, a modified pillar-stitch is provided for the first yarn system. A pillar stitch is also identified in knitting technology according to the guidance of the needles as a 1-0/0-1 pattern for open-lap pillar stitches and as a 1-0 pattern for closed-lap pillar stitches. Within the scope of the invention, there is thus a modification in that stitches are omitted, starting from such a pattern.

According to a preferred embodiment of the invention, it is provided that with the modified pillar-stitch pattern, a first number of $n \geq 1$, in particular $n \geq 2$, pillar stitches alternates with a second number of $m \geq 1$, in particular $m > 2$ missing overlaps along the working direction in a first repeating sequence in a modified pillar-stitch. For a particularly preferred embodiment, $n=2$ and $m=2$.

Within the scope of the invention, pillar stitches are preferably missed at least in a direct sequence of two pillar stitches. However, the yarns do not usually depart from the respective stitch wale. The yarns may run as a type of mislapping or as a partial weft, for example. According to a preferred embodiment, with the modified pillar-stitch, the yarns of the first yarn system form pillar stitches and are guided as a one-needle inlay in alternating sequence in the working direction. In the case of a one-needle inlay, the yarn is offset by one needle but without forming a stitch. As a one-needle inlay, the yarn remains on the same stitch wale, but runs there in a slight wavy or zigzag pattern.

According to the invention, the second yarn system of the first warp-knit layer is responsible for the binding tranversely, strength being achieved tranversely due to the diagonal course of the yarns over at least two adjacent stitch wales and running in the working direction. As already explained above, possibilities include a tricot lap pattern, a cord lap, a satin lap and a velvet lap, but these families of patterns are mentioned only as examples.

A cord lap is a good compromise with regard to the desired low elongation tranversely, the most breathable and open possible structure and an efficient utilization of material and is especially preferred for the second yarn system. A tricot lap is associated with a great flexibility tranversely, but with a satin or velvet lap, yarns are knit over several needles tranversely, thus resulting in a comparably dense and heavy structure.

According to a preferred embodiment of the invention, the spacer yarns are formed as monoyarn yarn, the fineness of which may be between 20 dtex and 110 dtex. Monoyarn yarns are characterized by a greater stiffness in comparison with multiyarn yarns of the same fineness. This is advantageous in particular for the restoring effect of the spacer yarns.

With regard to the first warp-knit layer and the second warp-knit layer, multiyarn yarns are preferably used for the corresponding yarn systems, but monoyarn yarns may also be considered.

The spacer yarns extend between the warp-knit layers, preferably with an oblique position running tranversely, such that the spacer yarns can be seen to intersect when seen along the working direction over the entire width of the warp-knitted spacer fabric. Such an array of spacer yarns is also referred to as an X pattern, preferably not leaving any channels running freely in the production direction to prevent any local weakening of the warp-knitted spacer fabric. The crosswise pattern in the context of an X pattern may intersect between the two warp-knit layers over neighboring stitch wales, but a greater distance tranversely is also bridged and thus a bigger intersection is possible. An X pattern makes it possible to prevent the two warp-knit layers from tilting relative to one another in an uncontrolled manner because the crosswise pattern of spacer yarns results in stabilization of the fabric in opposite directions.

The thickness of the warp-knitted spacer fabric determined over the two warp-knit layers and the spacer yarns between them is typically between 2 mm and 15 mm, with a range between 3 mm and 10 mm being preferred. A total thickness between 5 mm and 10 mm is especially preferred.

As already explained above, a composite material is a subject matter of the invention in which the covering and decorative layer are arranged on the first warp-knit layer of the warp-knitted spacer fabric, and the layers are usually laminated using a suitable adhesive.

Examples of suitable materials for the covering and decorative layer include leather, artificial leather and decorative films. In addition, however, textile covering and decorative layers may also be considered, in which case then the warp-knitted spacer fabric is provided as a technical textile for lining and upholstery.

Regardless of the specific embodiment of the covering and decorative layer, the warp-knitted spacer fabric according to the invention permits a particularly advantageous equalization of forces so that due to the low flexibility, but at the same time the low flexural strength of the first warp-knit layer, the covering and decorative layer is advantageously stabilized and at the same time compression or elongation in the plane is prevented.

In particular with regard to long-term use of the covering and decorative layer in the interior area of a motor vehicle, in furniture making or as a decorative material in the field of interior architecture, wear phenomena and local defects and weaknesses can be prevented or at least minimized by using a rigid as well as flexible substrate.

The invention also relates to use of the composite material described previously for the interior trim of a motor vehicle, wherein the composite material having a second warp-knit layer is applied to a nonplanar substrate. The substrate may be the backing of a dashboard, an instrument panel or additional parts of the interior, such as a center console, a vehicle crossbar, the doors or the headliner.

In addition, the surface of a seat, a bench or some other seating surface may also be provided with the composite material according to the invention in the interior furnishing of the motor vehicle.

BRIEF DESCRIPTION OF THE DRAWING

The invention is explained in greater detail below with reference to a drawing illustrating a single embodiment and in which.

SPECIFIC DESCRIPTION OF THE INVENTION

Figure 1:
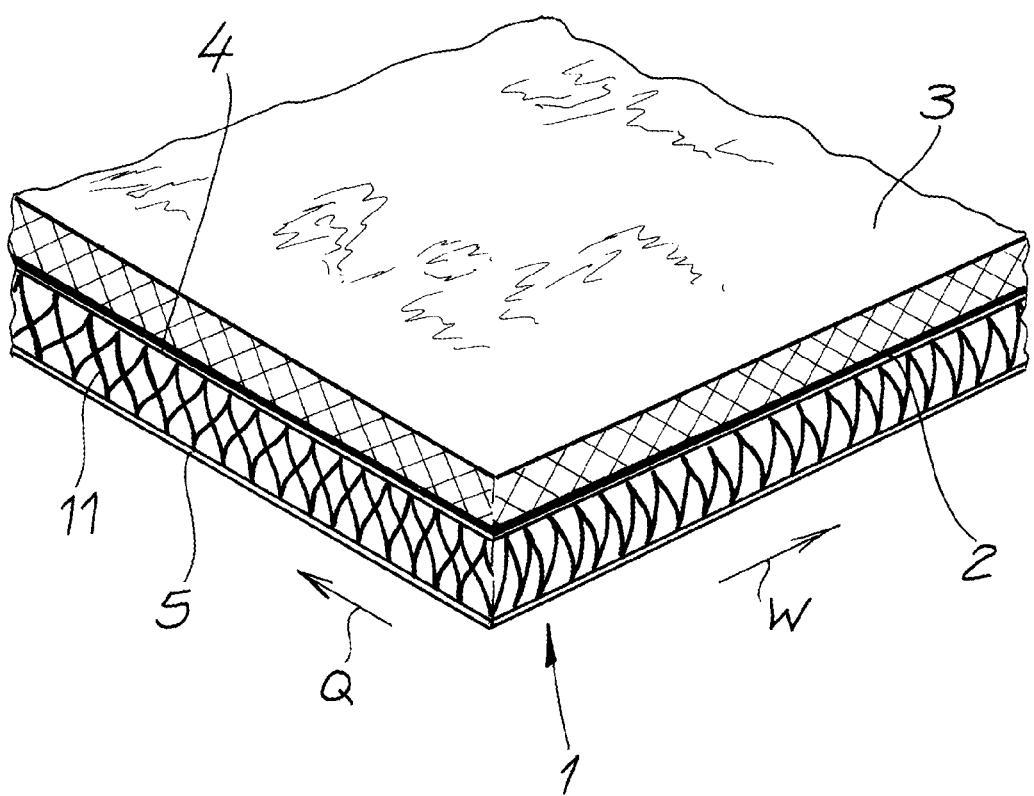
FIG. 1 shows a composite material with a warp-knitted spacer fabric and a covering and decorative layer.

FIG. 1 shows a composite material for the interior of a motor vehicle, having a warp-knitted spacer fabric 1 and a covering and decorative layer 3 made of leather, synthetic leather or a decorative film and laminated onto the warp-knitted spacer fabric 1.

Corresponding composite materials are used for the interior paneling and trim in motor vehicles, for example, where the covering and decorative layer 3 forms a high-quality surface. The warp-knitted spacer fabric 1 under it is provided to permit a uniform distribution of force and to ensure a nice feel. The covering and decorative layer 3 is lined with a resilient and yielding material in the form of the warp-knitted spacer fabric 1 under it.

In particular in the case of cladding of nonplanar areas and when using the composite material on a seat cover, a bench or some other seat surface, the warp-knitted spacer fabric 1 is also essential for a uniform distribution of force so that the covering and decorative layer 3 is also protected from damage or local wear in the long run.

According to the invention, the covering and decorative layer 3 is on top of a first warp-knit layer 4, while the composite material is applied to a substrate with an opposing second warp-knit layer 5.

According to the invention, the first warp-knit layer 4 and the second warp-knit layer 5 have fundamentally different properties.

Figure 2:
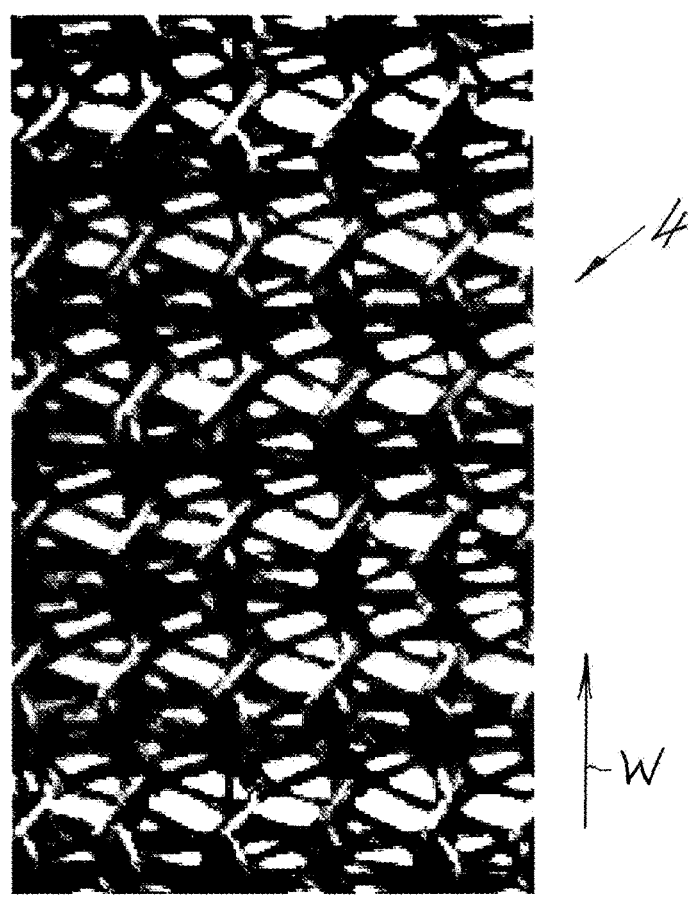
FIG. 2 is a view of a first warp-knit layer of the warp-knitted spacer fabric according to FIG. 1.
Figure 3:
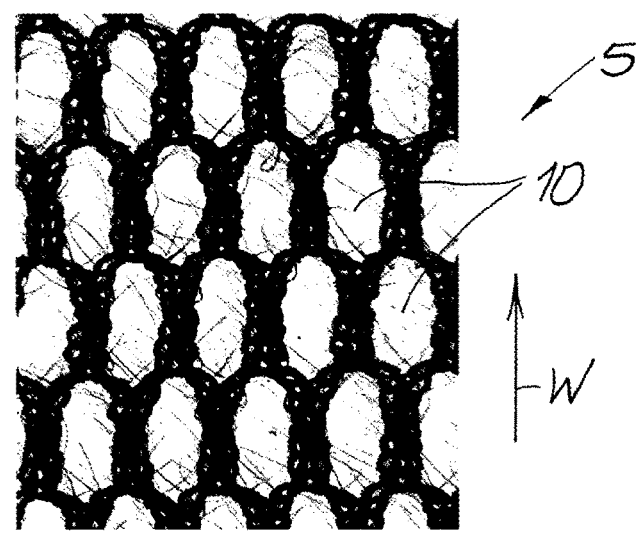
FIG. 3 is a view of a second warp-knit layer of the warp-knitted spacer fabric according to FIG. 1.

The large-scale view of FIG. 2 shows the structure of the first warp-knit layer 4 that is formed from a first yarn system 6 and a second yarn system 7.

Figure 4:
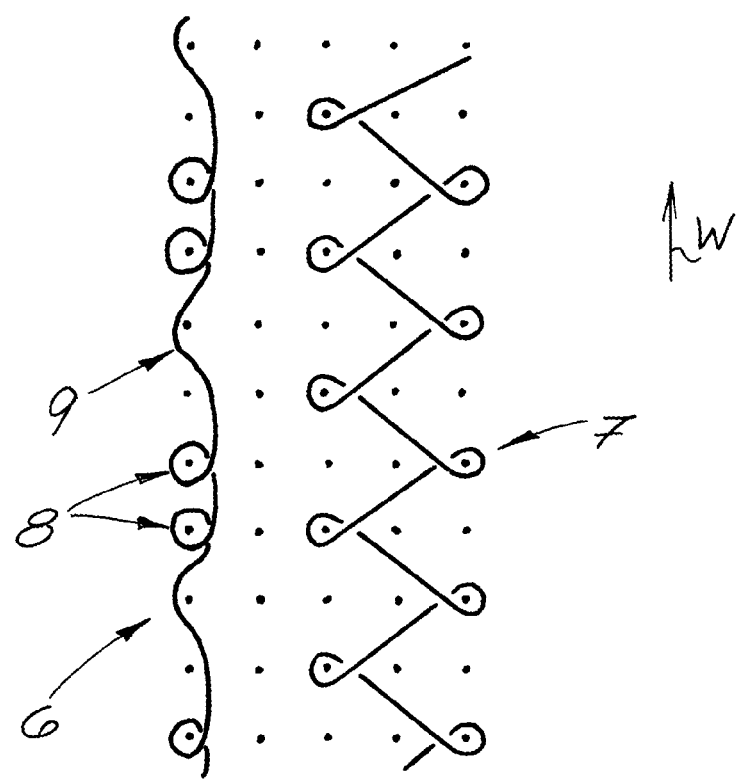
FIG. 4 shows the pattern of a first yarn system as well as second yarn system of the first warp-knit layer.

Detailed yarn patterns cannot be seen in FIG. 2, so that reference is made to FIG. 4 with regard to the pattern of the first yarn system 6 and the second yarn system 7. Accordingly, a modified pillar-stitch is provided as the first pattern for the first yarn system 6, in which the yarns of the first yarn system 6 form pillar stitches 8 in alternating sequence in the working direction W.

In this context, FIG. 4 shows a preferred embodiment, in which a first number of n=2 pillar stitches 8 alternates with a second number of m=2 stitches 9 omitted due to the guidance of the yarns as "weft less than 1" in a repeating sequence along the working direction W. The result is a pattern that repeats periodically in the working direction.

Since the yarns of the first yarn system 6 always run only along one stitch wale, the first yarn system 6 does not contribute toward stability tranversely, so the first warp-knit layer 4 can be bent up or down easily tranversely. Also as seen in the working direction W, the first warp-knit layer 4 can be bent up or down easily because the regions with the missing overlaps can easily be bent and/or put at an angle, so that the rows of stitches there can be easily bent relative to one another.

In this embodiment, the pattern 1-0/2-3 is a cord lap that is provided as the second yarn system 7. Because of the cord lap, there is a connection of the stitch wales in the transverse direction Q running in the working direction W.

As already explained above, the first warp-knit layer 4 can be bent out of the plane relatively easily due to the design of the first yarn system 6 and the second yarn system 7 according to the invention. On the other hand, the first warp-knit layer 4 has only a very low flexibility at the same time. This is achieved, on the one hand, by the fact that the yarns of the first yarn system 6 always run only on one stitch wale and are processed under tension in the knitting process, so that the material is flexible only slightly and/or only with a great expenditure of force in the working direction W. A low flexibility in the transverse direction Q is achieved by the cord lap, so that the individual yarns of the second yarn system 3 are each guided over three stitch wales adjacent one another.

The warp-knitted spacer fabric 1 according to the invention is characterized by mechanical properties that are definitely different from one another with regard to the two warp-knit layers 4, 5. Whereas the first warp-knit layer 4 has a high tensile strength, the second warp-knit layer 5 has openings 10 formed by a plurality of stitches. Such a structure can be created easily by two yarn systems of the second warp-knit layer 5 in a filet pattern. Due to the approximately oval openings 10, the second warp-knit layer 5 can be stretched slightly in the working direction W as well as in the transverse direction Q and thus permits an optimal adaptation to a substrate.

Figure 5A:
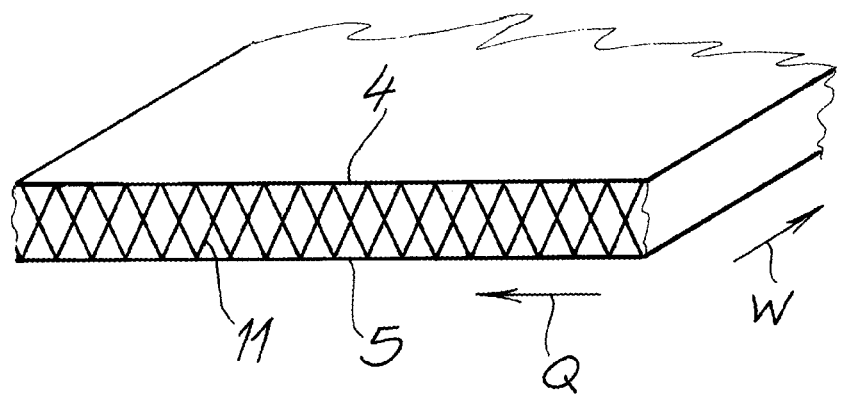
FIGS. 5a to 5c show the bending of the warp-knitted spacer fabric in a purely schematic view with a direction of view along the working direction.
Figure 5B:
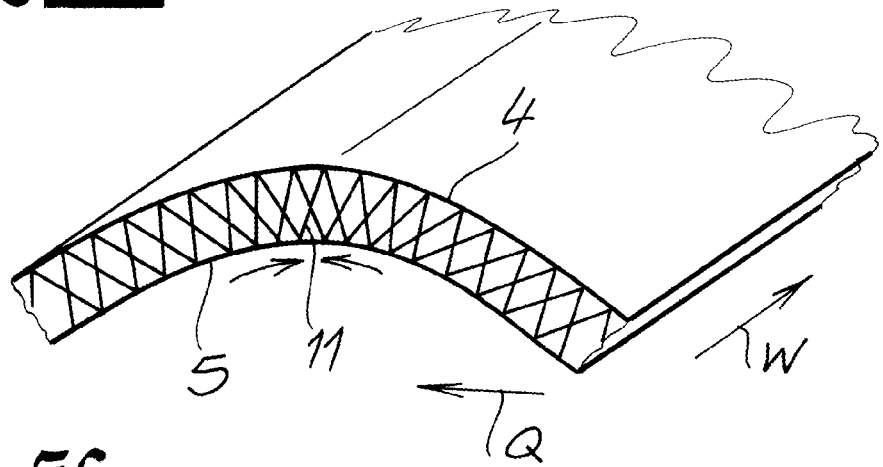
Figure 5C:
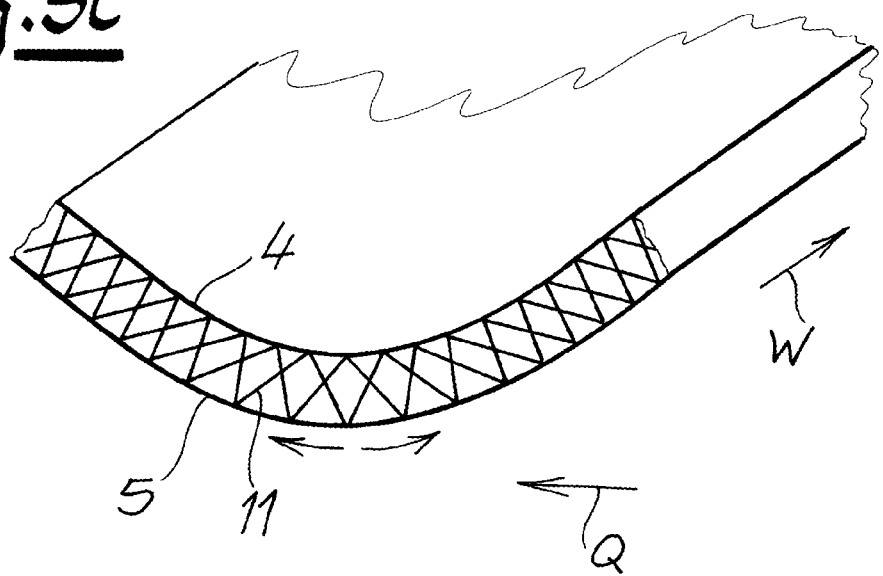

The asymmetrical mechanical properties of the warp-knitted spacer fabric 1 according to the invention are also shown in FIGS. 5*a* to 5*c*. These figures show a view of the warp-knitted spacer fabric with a direction of view along the working direction W. As in FIG. 1, the spacer yarns 11 arranged between the two warp-knit layers 4, 5 are arranged in an X pattern, so that the two warp-knit layers 4, 5 are protected against lateral tilting relative to one another. The diagrams in FIGS. 5*a* to 5*c* show the first warp-knit layer 4 at the top and the second warp-knit layer 5 at the bottom.

When the warp-knitted spacer fabric 1 is lying in a plane (FIG. 5*a*), the stitch wales running in the working direction W are equidistant on the two warp-knit layers 4, 5.

However, if the warp-knitted spacer fabric is curved in the direction of the second warp-knit layer 5 (FIG. 5*b*) then the spacing between neighboring stitch wales is approximately maintained in the first warp-knit layer 4 because of the low flexibility in the plane, whereas the second warp-knit layer 5 is compressed due to its high deformability because of the openings 10 and therefore the stitch wales are brought closer together locally.

On bending the warp-knitted spacer fabric 1 in the opposite direction away from the first warp-knit layer (FIG. 5*c*), the equidistant spacing between the stitch wales running in the production direction is also retained due to the low flexibility of the first warp-knit layer there, regardless of the bending, whereas the second warp-knit layer 5 stretches on the opposite end and thus can compensate for the bending. Because of the high mobility of the second warp-knit layer 5, the first warp-knit layer 4 can be protected from tension and negative force effects, this warp-knit layer being laminated to the covering and decorative layer 3 according to FIG. 1.

With the design according to the invention, it is possible to ensure that the covering and decorative layer 3 is optimally protected from kinking, tension and the like.

For example, in the case of a U-shaped bend that in practice is also referred to as a "half-pipe test," kinking can be prevented even with a comparatively great bend. Even with great deformation of the composite material, for example, in the case of sewing this results in definite improvements in comparison with the embodiments known from the state of the art within the scope of the present invention.

In addition, after folding or bending or some other deformation, the material according to the invention is also characterized by very good behavior returning to its initial form and/or the form predetermined by the backing.

We claim:

1. In a warp-knitted spacer fabric comprising:
   a planar first warp-knit layer formed by a first yarn system having a first pattern and by a second yarn system having a second pattern, the first pattern being a modified pillar-stitch in which the yarns of the first yarn system form a first plurality of pillar stitches alternating with a second plurality of stitches with missing overlaps, the yarns of the second yarn system each being guided over at least two adjacent stitch wales and running in the working direction,
   a planar second warp-knit layer having a filet pattern forming a plurality of openings each formed by a respective plurality of stitches, and
   spacer yarns joining together the first and second warp-knit layers.

2. The warp-knitted spacer fabric defined in claim 1, wherein the yarns of the first yarn system form in the modified pillar-stitch pillar stitches in alternating sequence in the working direction and are guided as a weft of less than 1.

3. The warp-knitted spacer fabric defined in claim 1, wherein the yarns forming the second warp-knit layer form stitches in each stitch wale.

4. The warp-knitted spacer fabric according to claim 1, wherein the second yarn system is formed by a cord lap.

5. The warp-knitted spacer fabric according to claim 1, wherein a first number of n≥1 pillar stitches alternate with a second number m≥1 of stitches in a repeating sequence in the modified pillar-stitch along the working direction.

6. The warp-knitted spacer fabric according to claim 1, wherein the spacer yarns are between the warp-knit layers with an oblique position running in the transverse direction, and the spacer yarns intersect with a direction of view along the working direction over the total width of the warp-knitted spacer fabric.

7. The warp-knitted spacer fabric according to claim 1, wherein the thickness determined over both warp-knit layers and the spacer yarns in between them between 2 mm and 15 mm.

8. A composite material for an interior area of a motor vehicle, the material having a warp-knitted spacer fabric according to claim 1 and having a covering and decorative layer laminated on the first warp-knit layer of the warp-knitted spacer fabric.

9. The composite material defined in claim 8, wherein the covering and decorative layer is formed by a material selected from the group consisting of leather, synthetic leather, decorative films and textile.

10. The composite material defined in claim 8, wherein the covering and decorative layer is bonded to the first warp-knit layer.

* * * * *